Jan. 26, 1932.  H. MARLES  1,842,476
ENGINE CONTROL MECHANISM
Filed Jan. 12, 1931
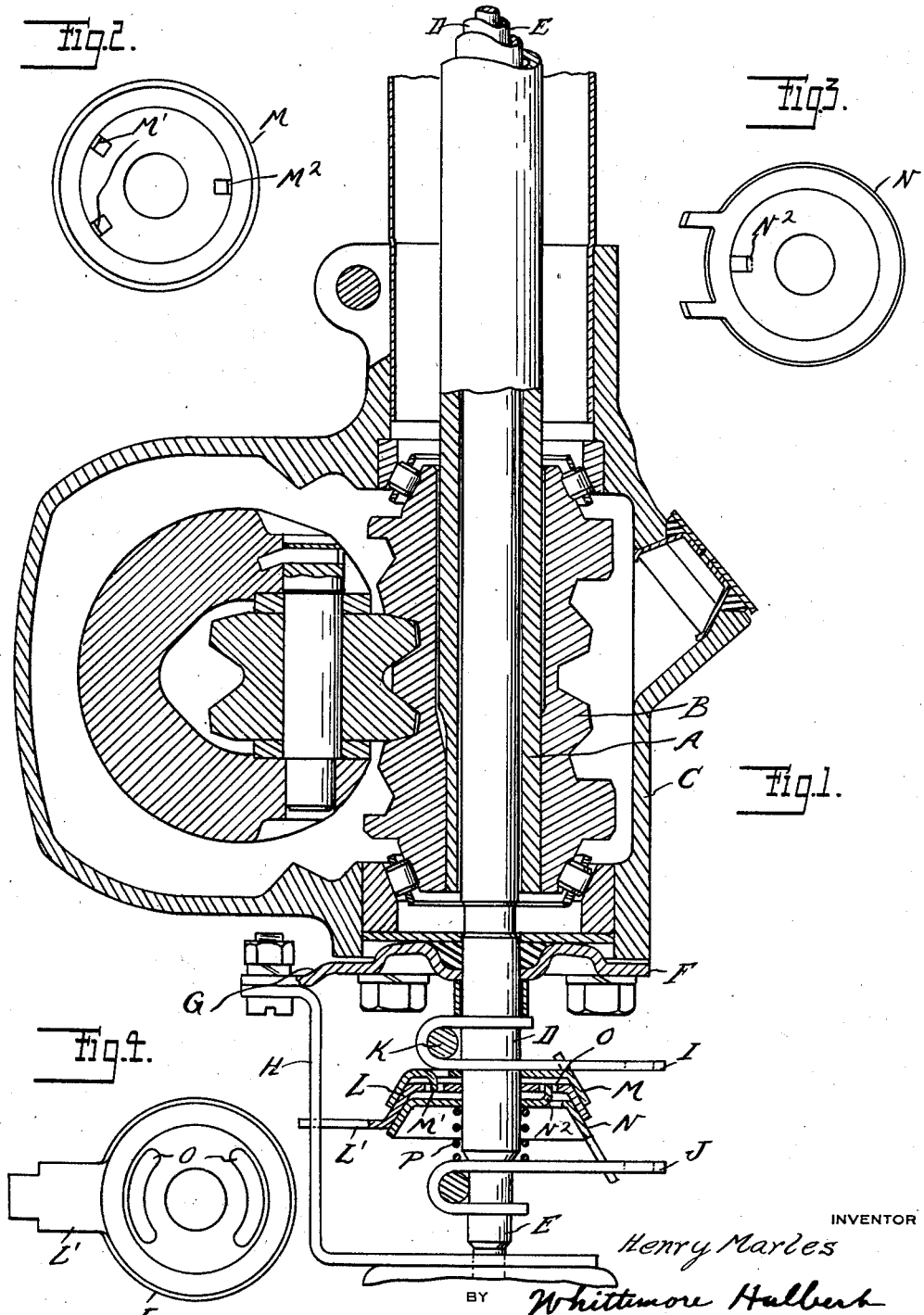
INVENTOR
Henry Marles
BY Whittemore Hulbert
Whittemore + Belknap
ATTORNEY Patented Jan. 26, 1932

1,842,476

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

ENGINE CONTROL MECHANISM

Application filed January 12, 1931. Serial No. 508,345.

The invention relates to engine control mechanisms such as are used on motor vehicles in connection with the steering wheel, and the invention consists in the novel construction as hereinafter set forth.

In the drawings:

Figure 1 is a longitudinal section through a portion of a steering gear to which my improved construction is applied;

Figures 2, 3 and 4 are plan views showing several of the elements.

With engine control mechanism of the type above referred to, it is usual to employ concentric tubular shafts which pass through the hollow steering stem and are connected at their lower ends with the mechanism to be actuated thereby. It is usual to provide friction means for holding the shafts from displacement either by rotation of the steering wheel or the adjustment of another control. The present invention relates to the specific construction of this friction means and cooperating parts which is as follows:

A is the tubular steering stem for actuating the worm B and C is the housing therefor. D and E are the tubular control shafts which are concentrically arranged within the stem A and which extend through and beyond the casing C. At the lower end of the casing C is a head F secured thereto and having a laterally extending ear G to which is secured a depending angular arm H. I and J are rock arms secured respectively to the tubular shafts D and E, each being preferably formed of a return bent strip apertured to be sleeved upon the shaft and slotted through the return bent to permit of clamping to the shaft by a bolt K engaging the return bend.

My improved friction means is arranged between the arms I and J and comprises a plurality of cupped members in nested relation. All of these members are centrally apertured to be sleeved upon a portion of the shaft D and the central member L is provided with a laterally extending arm L' which slidably engages the angular bracket H to be held thereby from rotation. The cupped members M and N are upon opposite sides of the member L and have struck-up portions for respectively engaging the rock arms I and J. The member M has struck out therefrom the ears M' which embrace the arm I and the member N is provided with the extended ears N' which embrace the member J. In addition to these ears M' and N' the members M and N have the struck-out portions M² and N² which engage segmental slots O in the member L. This serves to limit the angular adjustment of the shafts D and E to that permitted by the length of the slots O. A coil spring P is sleeved upon the shaft D one end abutting against the arm J and the other engaging the member N.

With the construction as described, the frictional resistance to the rotation of the shafts D and E is determined first by the frictional engagement of the cups of the members L, M and N and second, by the tension of the spring P. Thus by suitably regulating the tension of this spring any desired resistance may be obtained. The whole construction is exceedingly simple and inexpensive to manufacture, as all of the parts are formed from stamped and pressed sheet metal.

What I claim as my invention is:

1. In a control mechanism, the combination with a plurality of concentric tubular shafts, of rock arms secured to projecting portions of said shafts and friction means interposed between said rock arms comprising a plurality of cupped and nested members, the outer members thereof having interlocking engagement respectively with said rock arms, and the inner member being provided with a projecting angular arm.

2. In an engine control mechanism, the combination with a plurality of concentric tubular shafts, of rock arms secured to projecting portions of said shafts, and a friction means therefor comprising a plurality of cupped nested members in frictional engagement with each other, the outer of said members having projecting ears for respectively engaging said rock arms and the intermediate member having a projecting angular arm, and a spring sleeved upon one of said tubular shafts for yieldably pressing said cups into frictional engagement.

3. In a control mechanism the combination with a shaft and a rock arm secured thereto, of a plurality of cupped nested members sleeved upon said shaft, one of said members having an interlocking engagement with said rock arm and another of said members being provided with an anchor arm, and yieldable resilient means for pressing said cupped members into frictional engagement with each other.

4. In a control mechanism, the combination with a rock shaft, of a rock arm secured thereto, a plurality of cupped nested sheet metal members sleeved upon said shaft, one of said members having a struck-out portion for interlocking engagement with said rock arm, and another of said members having a projection anchored arm, and a spring sleeved on said shaft and yieldably pressing said cupped member into frictional engagement.

5. In a control mechanism, the combination with a plurality of concentric tubular shafts, the inner shaft having a portion projecting beyond an outer one, of rock arms secured to said shafts and spaced from each other, a plurality of nested cupped members sleeved on said shaft intermediate said rock arms, a spring also sleeved on said shaft between said rock arms for yieldably pressing said cupped member into frictional engagement, the outer of said cupped members being provided with projecting portions for respectively interlocking with said rock arms and the inner of said cupped members being provided with a projecting arm, and an anchor arm with which said projecting arm engages to hold said inner member from rotation.

In testimony whereof I affix my signature.

HENRY MARLES.